United States Patent [19]
Johann

[11] Patent Number: 5,471,467
[45] Date of Patent: Nov. 28, 1995

[54] ROUTING LOGIC MEANS AND METHOD FOR DISTRIBUTING A PACKET AMONG NETWORK NODES

[75] Inventor: Charles F. M. Johann, Eindhoven, Netherlands

[73] Assignee: Alcatel N.V., Amsterdam, Netherlands

[21] Appl. No.: 57,656

[22] Filed: May 4, 1993

[30]    Foreign Application Priority Data

May 8, 1992  [EP]   European Pat. Off. ............ 92201314

[51] Int. Cl.$^6$ .................................................. H04L 12/56
[52] U.S. Cl. .......................................... 370/60; 370/94.1
[58] Field of Search ......................... 370/13, 16, 54, 370/60, 94.1, 94.3, 95.1, 17; 379/220, 221; 340/825.02, 826, 827

[56]            References Cited

U.S. PATENT DOCUMENTS

| | | | |
|---|---|---|---|
| 4,905,233 | 2/1990 | Cain et al. | 370/94.1 |
| 4,974,224 | 11/1990 | Boone | 370/94.1 |
| 5,031,093 | 7/1991 | Hasegawa | 370/17 |
| 5,088,032 | 2/1992 | Bosack | 370/94.1 |
| 5,115,495 | 5/1992 | Tsuchiya et al. | 370/94.1 |
| 5,117,422 | 5/1992 | Hauptschein et al. | 370/95.1 |
| 5,142,531 | 8/1992 | Kirby | 370/94.3 |
| 5,243,592 | 9/1993 | Perlman et al. | 370/17 |
| 5,253,248 | 10/1993 | Dravida et al. | 370/16 |
| 5,274,643 | 12/1993 | Fisk | 370/94.1 |

OTHER PUBLICATIONS

"Shortest Path First with Emergency Exits", Wang et al., 8282 Computer Communication Review, Sep. 20, 1990, No. 4, New York, U.S. pp. 166–173.

"An Extended Least-Hop Distributed Routing Algorithm", Nelson et al., IEEE Transactions on Communications, vol. 38, No. 4, Apr. 1990, pp. 520–528.

*Primary Examiner*—Douglas W. Olms
*Assistant Examiner*—Chau T. Nguyen
*Attorney, Agent, or Firm*—Vinson & Elkins

[57]            ABSTRACT

A routing logic system and methodology for adaptive and distributed routing in packet switching networks makes an accurate routing choice needing only minimal signalling overhead. This is achieved by combining only local delay information with less dynamic topological information, such as the hop distance to the destination node, into a third cost value and making the routing decision based on this third cost value. This is a first portion of a possible path, the remaining second portion being accounted for via the hop distance represented by it.

51 Claims, 2 Drawing Sheets

ROUTING LOGIC MEANS AND METHOD FOR DISTRIBUTING A PACKET AMONG NETWORK NODES

The present invention relates to a routing logic means and methodology incorporated in a packet switching node which forms part of a packet switching network comprising a plurality of other packet switching nodes interconnected by respective links.

BACKGROUND OF THE INVENTION

Certain routing logic means are already known in the art, e.g. from the paper "An extended least-hop distributed routing algorithm," by Don J. Nelson et al., IEEE Transactions on communications, Vol. 38, No 4, April 1990, pp. 520–528. Therein the routing logic means execute a routing algorithm described in part III of the paper "Nelhnet Fundamentals." The routing logic means and routing algorithm proposed in this paper are concerned with adaptive and distributed routing in a connectionless environment. Adaptive routing means that the parameters in the routing strategy are changed as a function of the network status, i.e. the transmission delay and the network topology. Distributed routing means that the routing choice is essentially made in a decentralized way, i.e. every node includes a routing logic means which determines essentially independently the next node to which a packet has to be transmitted, in order to reach a destination node with least costs e.g. with least delay. Hence, in using distributed routing, an optimal path through the packet switching network is progressively built up for every packet to be switched by letting the routing logic means in every node decide on an optimal continuation of the part of the optimal path already determined.

In the aforementioned paper the choice made by the routing logic means is based on two characteristics of the packet switching network, i.e. the transmission delay and the network topology. An optimal next node is chosen by sequentially optimizing the above two characteristics. Firstly only those next nodes are considered for which the minimal number of nodes between the latter next nodes and the destination node are below or equal to a threshold value. In one embodiment of the routing logic means of the above paper this threshold value is the minimal number of nodes between a next node and the destination node taken over all possible next nodes. Secondly, out of the remaining set of next nodes, the next node is chosen for which an estimated transmission delay to the destination node is minimal. The latter estimated delay is in this system the sum of a nodal delay for transmission to a particular next node and a destination delay which is an estimate of the minimal transmission delay from a particular next node to the destination node taken over all possible paths interconnecting the latter two nodes.

The above algorithm uses an estimate of the total delay to the destination node. This leads to signalling and processing overhead in order to distribute this delay information over a possibly very large packet switching network. Moreover, due to the dynamic nature of this delay information, and the signalling delay incurred by it, this delay information can be very inaccurate when it is used in a particular node. It can be verified that reducing the signalling and processing overhead further reduces the accuracy of the delay information whereas increasing the accuracy of the delay information results vice versa in an increase of the above mentioned overhead. The problem of this type of routing logic means thus is providing accurate information while keeping the overhead to a minimum. In any case, by taking into account also topological information a packet can be prevented from being trapped in a loop. The way in which this is accomplished however leads to a complex routing logic means needing much signalling overhead and, moreover, leads to an inflexible routing algorithm, not able for instance to adapt the relative importance of the above two criteria because they are sequentially and hence independently optimized.

An object of the present invention is to provide a routing logic means eliminating part of the above mentioned signalling overhead and flexibly routing packets based on accurate delay information.

SUMMARY OF THE INVENTION

The above-stated object is achieved due to the fact that the routing logic means under the present invention is able to choose, for a packet to be transmitted over said network to a destination node, a partial path from a plurality of possible partial paths each originating in said node and comprising X of said other packet switching nodes and their respective interconnecting links, said choice being based on the result of the combination of at least a first cost value and a second cost value, said combination being made at least for each one of said plurality of possible partial paths, and that said first cost value is an estimated transmission delay over a first portion of a possible path, said possible path connecting said node with said destination node and including one of said possible partial paths, and that said second cost value is an estimated transfer cost, different from the transfer delay, over a second portion of said possible path.

In this way the above two characteristics no longer are optimized sequentially but are considered jointly via a third cost value which is a combination of the first and second cost value, after for instance first weighing their actual relative importance. Moreover by only considering the transmission delay estimated over a first portion of a possible path, the signalling overhead can be diminished and the reliability of the delay information is not affected by inaccurate delays as only delay information relating to relatively small first portions will be taken into account. The second cost value, e.g. relating to the topology of the network, must be of a less dynamic nature thereby taking into account the total possible path up to the destination node without taking into account unreliable delay information and without needing much signalling.

Note that the above mentioned routing logic means is applicable to connectionless switching networks as well as connection oriented switching networks e.g. during the path search phase.

Further flexibility is offered by the proposed routing logic means due to the fact that it can determine not only the optimal next node but also the optimal partial path including a plurality of nodes. In this way the processing overhead is diminished without departing from the distributed routing strategy. The latter fact can be for instance advantageous in bypassing congested areas and alleviating their operation by routing packets through them without having to make routing decisions in such a congested area. A further possible use of determining an optimal partial path comprising a plurality of nodes presents itself in switching networks wherein the different switching nodes do not all possess a same processing power, nodes with a smaller processing power being loaded less with routing decisions by intelligently determining the values of X on a network scale.

Further advantageous features of the present invention are that said combination is a weighed combination of a first and a second relative value deduced from said first and said second cost value respectively by dividing them by the mean value of said respective cost values taken over all of said considered possible paths, and that said choice is based at least on minimizing said third cost value and that said weighted combination reflects a relative importance of said respective cost values and that said relative importance is adapted according to relative fluctuations of said respective cost values over a time interval so as to give less weight to those cost values having large relative fluctuations.

In the above features, a specific way of flexible change of the routing strategy made possible with the present invention is described. The combined values realizing the third cost value are preferably relative values because the first and second cost values are expressed in different metrics. The weight used in the combination is adapted in such a way as to take into account to a lesser extent that cost value which has proven, at a specific time instant, to be rather unreliable as evidenced from rapid fluctuations thereof. In this way the mentioned choice is mainly based on the most reliable cost value.

An important aspect of the present invention is that said packet includes a credit counter with a value CC which is initialized upon entering said network and that said routing logic means only considers those partial paths as possible partial paths for which the minimum number of nodes N from the end node of said partial path to said destination node and the minimum number of nodes M from said node in which said choice is made to said destination node satisfy the expression:

$$M+CC \geq X+N$$

A drawback of many distributed routing strategies is that looping may occur, i.e. a packet is sent through a same set of switching nodes for some time. This is mainly due to the fact that only local information is used for the routing choice in a particular node. A less dramatic effect of the aforementioned type of routing choice is that packets are sent to the wrong direction because no overall view of the switching network is used in such a routing choice.

According to the above mentioned aspect of the present invention such drawbacks can be simply avoided by not considering those partial paths which would lead the packet in such wrong directions. Indeed, the credit counter can be considered as a threshold value eliminating those partial paths which lead the packet to a node in which the minimum number of nodes to the destination node is increased with a value higher than this threshold value compared to the minimum number of nodes to the destination node in its starting position. This technique is comparable to the one used in the referenced article but is simpler to implement. Moreover, use of the credit counter leads to a more flexible routing method because the threshold can be determined separately for every packet to be transmitted. In this way the freedom to deviate from the shortest path can be determined with respect to characteristics such as destination node and type of connection, for each packet separately.

A further aspect of the present invention is that said routing logic means ensures that at the end node of said chosen partial path said credit counter value is increased with a value $M-(N+X)$.

The above aspect further minimizes the chance of a packet being constantly routed in a wrong direction. In particular, looping can be completely avoided because the actual path taken through the switching network now deviates from the shortest path maximally with the value of the credit counter. Indeed, in deviating from the shortest path the freedom to further deviate therefrom by the packet is accordingly diminished by changing the credit counter value according to the above expression.

BRIEF DESCRIPTION OF THE DRAWINGS

The above mentioned and other objects and features of the invention will become more apparent and the invention itself will be best understood by referring to the following description of an embodiment taken in conjunction with the accompanying drawings wherein:

FIG. 1b shows a packet to be routed by the switching node 3 of the network shown in FIG. 1a;

DETAILED DESCRIPTION OF THE INVENTION

Figure 1A:
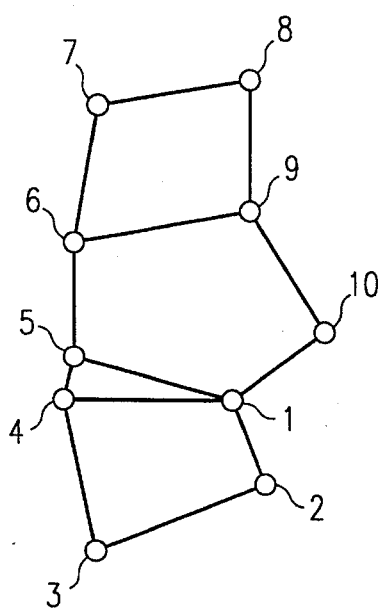
FIG. 1a shows a packet switching network in the nodes of which a routing logic means according to the present invention is used.

The ten node network shown in FIG. 1a will be used to describe the operation of a routing logic means according to the present invention. This network corresponds to the test network used in the paper "Extended least-hop distributed routing algorithm", by Don J. Nelson et al, IEEE transactions on communications, Vol. 38, No 4, April, 1990; pp. 520–528 and is presented therein in FIG. 1 and used to test the Nelhnet routing algorithm proposed therein. The switching nodes used in this test network may be of any type, many types of which are well known in the art; therefore the architecture of such switching nodes is neither described nor shown in further detail. To realize the routing logic means, either use can be made of existing processors and memories or supplemental hardware can be devised; in both cases it can be implemented by a skilled person from the further description of its operation. The specific hardware and eventual software needed for this implementation will thus not be described in detail.

It is to be noted that the advantages derived from the present invention will be not outspoken when using large, dynamic switching networks as the problem of providing accurate delay information whilst minimizing the processing and signalling overhead is then relatively more difficult to resolve. However, for simplicity's sake the routing logic means will here be described with reference to a rather small test network as shown in FIG. 1a.

Figure 1B:
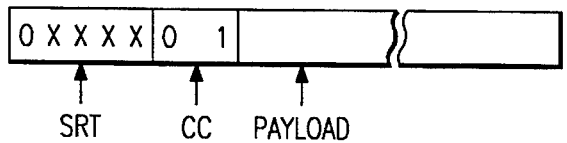

The operation of the routing logic means will hereafter be described via an example of a packet, shown in FIG. 1b, to be transmitted over the network, shown in FIG. 1a, from node 3 to a destination node, namely, node 9. The routing logic means of every node in the switching network executes a same decision strategy. This strategy is visualized in a first flow chart, shown in FIG. 2, which incorporates a second flow chart shown in FIG. 3. The above mentioned example will be described with reference to these flow charts.

The packet to be routed by node 3 includes a self routing tag SRT which is 5 bits long, a credit counter CC of 2 bits and a payload part p. In the present example SRT consists of a leading zero and 4 further bits which are don't cares X. Note that the latter 4 bits of SRT may be used to specify a particular destination node as described in greater detail below. CC has a like named binary value of 01.

Figure 2:
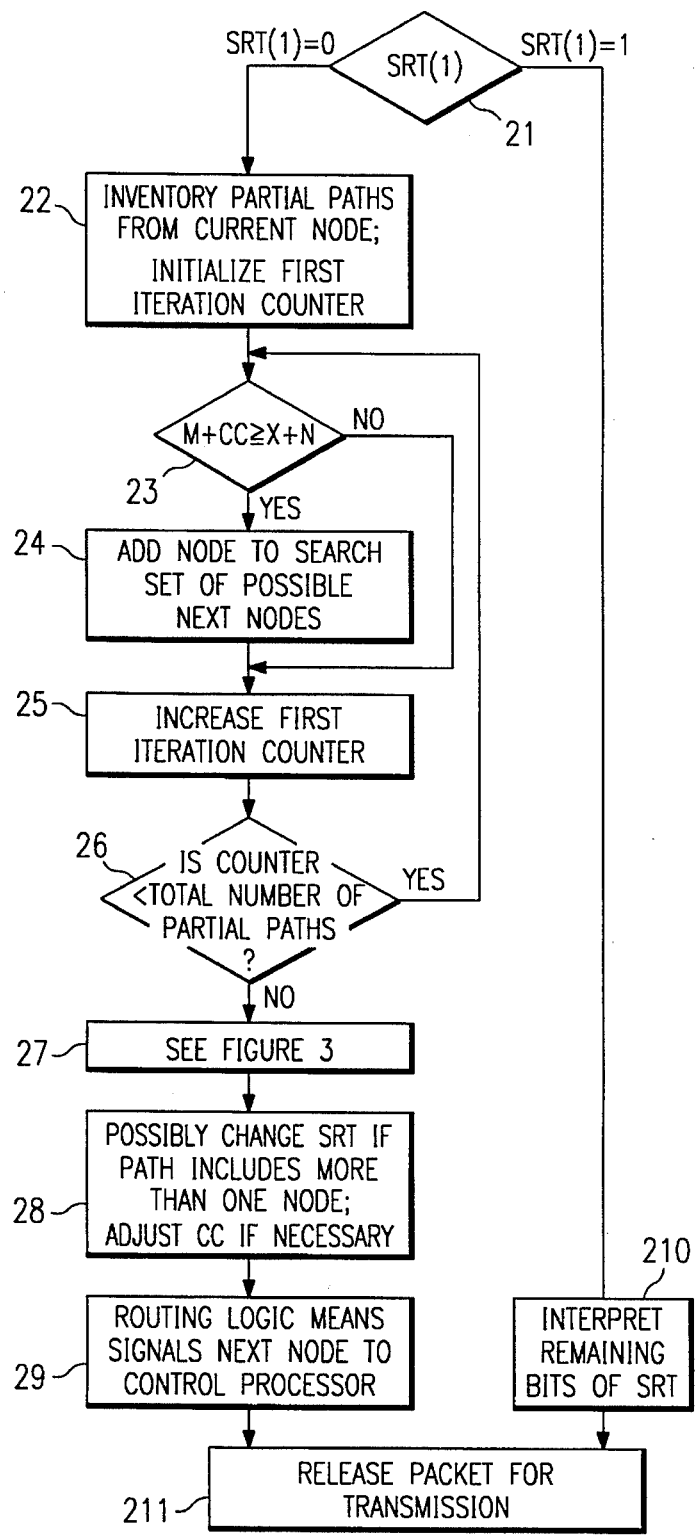
FIG. 2 shows a flow diagram of actions executed by a routing logic means according to the present invention.

The routing logic means of node 3, in this example, determines an optimal partial path comprising X nodes where X equals one, i.e. it determines an optimal next node. With every packet received it executes a flow chart as represented in FIG. 2 wherefore it consults two tables. The first table corresponds to a first cost value, namely, the estimated transmission delay over a first portion of a possible path connecting node 3 with the destination node 9. This first portion comprises Y nodes, Y equalling 1 in this case so that each first portion corresponds exactly to one of the partial paths. The second table corresponds to a second cost value, namely, the number of nodes in a second portion of such a possible path. This number will be further called hop-distance.

It is to be noted that only one possible path is considered per partial path, namely, that possible path with minimal hop distance in the second portion taken over all possible second portions. The entry in Table 2 therefore is per possible destination node the minimal hop distance from the end point of a partial path, i.e. from the next node in the present example, to that destination node.

In the present example the next nodes are nodes 2 and 4 and in the rows of the tables the respective cost values are entered. In the second table the column has to be selected which corresponds to the actual destination node, namely, node 9.

The first and second tables are represented hereafter

TABLE 1

| | delay in nsec |
|---|---|
| 2 | 50 |
| 4 | 30 |

TABLE 2

| | Hop distance | | | | | | | | | |
|---|---|---|---|---|---|---|---|---|---|---|
| | 1 | 2 | 3 | 4 | 5 | 6 | 7 | 8 | 9 | 10 |
| 2 | 1 | 0 | 1 | 2 | 2 | 3 | 4 | 4 | 3 | 2 |
| 4 | 1 | 2 | 1 | 0 | 1 | 2 | 3 | 4 | 3 | 2 |

Turning now to the flow chart of FIG. 2, the routing logic means of node 3 will route the packet of FIG. 1b in the following manner.

First, in Box 21 of the flow chart, the routing logic means examines the leading bit of the self routing tag SRT. This bit indicates whether the packet is to be routed according to further information contained in the other bits of the self routing tag SRT or whether a routing choice is to be made by the routing logic means. In the instance of the packet depicted in FIG. 1b this bit is zero and, thus, the routing logic means has to make a routing choice wherefore it proceeds to Box 22 which path is indicated in FIG. 2 as SRT(1)=0. If on the contrary SRT(1)=1 the routing logic means would proceed to 210 to retrieve the identity of the next node specified in the self routing tag SRT as will be discussed in more detail further below.

In 22 the routing logic means makes an inventory of all partial paths originating in its node and comprising X=1 nodes. In the present case next nodes 2 and 4 form part of this total set. Hereafter, in 23, each of these next nodes is checked in order to determine whether they are to be further considered as possible next nodes. In the present embodiment this means that the validity of the expression $$M+CC>=X+N \tag{1}$$

is checked. In the above expression M is the hop distance from the node to which the routing logic means belongs, i.e. node 3, to the destination node, i.e. node 9, wherefore in this case M equals 4.

N is dependent upon which next node is being considered. For the first next node of the total set of next nodes, i.e. for node 2, N is the hop distance from the end node of the partial path to the destination node, i.e. from node 2 to node 9. N thus equals 3 as indicated in column 9 of Table 2, the column number corresponding to the number of the destination node, and in the row belonging to the considered partial path, i.e. in this case the first row. It can then be verified that expression (1) is indeed valid for next node 2 so that the routing logic means further proceeds to 24. In 24 next node 2 is added to a search set which will later be used for making the actual routing choice.

Note that expression (1) basically checks whether in routing the packet over a particular partial path, the hop distance at the end point of this partial path decreases accordingly with X, X being the number of nodes in the partial path. In this way it can be ensured that the packet will take the shortest path, expressed in hop distances to the destination node. This restriction is alleviated and the freedom in routing choice is enlarged by taking into account the credit counter which allows the packet to deviate from the shortest path but ensures that this deviation stays below a threshold value which is just the value of the credit counter CC.

Hereafter the routing logic means of node 3 arrives in 25, in which it would have directly arrived from 23 when expression (1) was found to be false. In 25 an iteration counter is increased which was initialized at zero in 22. Further, in 26, the routing logic means checks if the iteration counter is smaller than the number of partial paths in the total set, which in the present case comprises nodes 2 and 4. In finding that the above holds true, the routing logic means jumps back to 23 wherein a further partial path, indicated by the iteration counter, is checked, i.e. node 4. For the latter node N again equals 3 as can be seen from the ninth column, second row of Table 2 so that node 4 is also added to the search set in 24. After a further increment of the iteration counter in 25, the routing logic means derives in 26 that its value is no longer smaller than the number of partial paths in the total set wherefore it jumps to 27 as indicated in FIG. 2.

In 27 the actual routing choice is made in accordance with the present invention between the possible partial paths comprised in the above determined search set. This will be discussed in detail later with reference to FIG. 3 in which 27 is further detailed.

After making this choice, in 28, the routing logic means possibly changes the self routing tag SRT according to the chosen partial path. The latter is necessary when a partial path comprising more than one node was to be chosen which will be described later. In node 3, as previously mentioned, only a next node was to be chosen 35 and, hence, this self routing tag SRT can remain unchanged. Further, also in 28, the credit counter value CC has to be increased with a value according to the following expression:

$$M-(N+X) \tag{2}$$

In order to completely avoid looping it has to be made certain that the effective path taken to the destination node deviates from the shortest path by at most the threshold value expressed as the credit counter CC. In making a particular routing choice deviating from the shortest path, the credit counter CC thus has to be decreased with the value of this deviation in hop distance. In the present example, regardless of which node out of the search set was actually chosen the value according to (2) is zero as both node 2 and node 4 yield an N equalling 3.

Hereafter, in 29, the routing logic means signals to the control processor of the switching node to which next node the packet is to be transmitted. Finally, in 211, the routing logic means releases the packet in order for it to be appropriately transmitted by node 3. It is to be noted that in case a next node was specified in the self routing tag SRT an alternative path, described in detail later, from 21 over 210 to 211 is to be taken.

With reference to the flow chart of FIG. 3 the actual routing choice corresponding to decision block 27 of FIG. 2 will now be described in detail for the above example.

Figure 4:
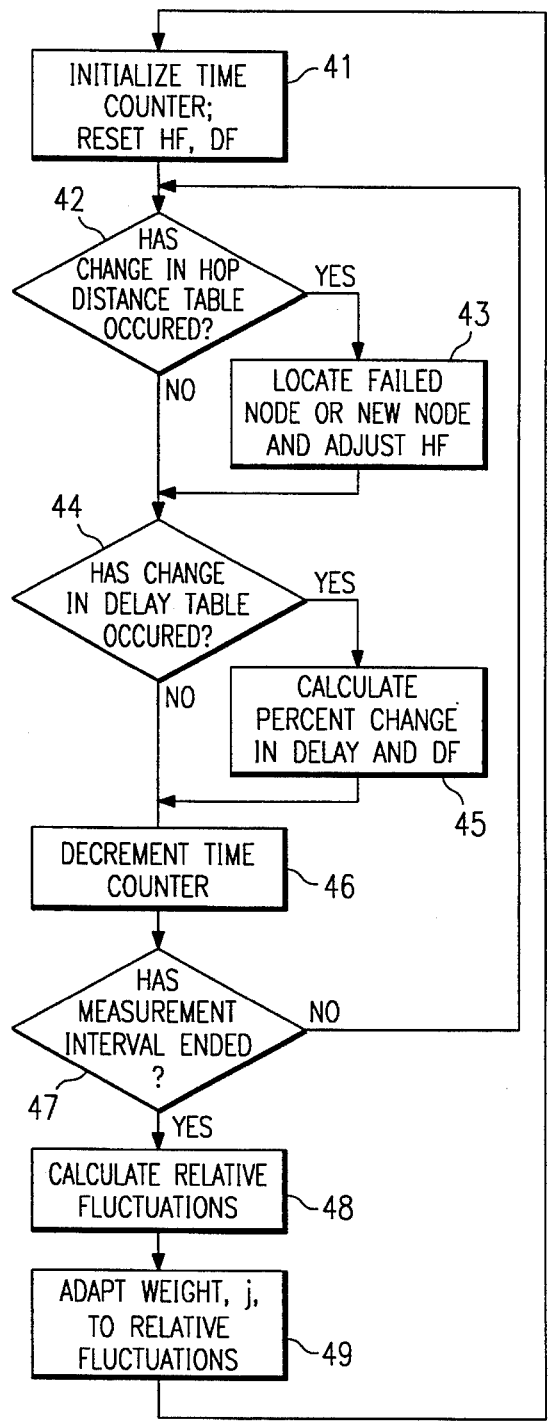
FIG. 4 shows a last flow diagram of actions executed by the routing logic means in determining a weight j.

Firstly, in 31 the mean delay MD and the mean hop distance MH to a particular destination node taken over all possible partial paths comprised in the search set are calculated. This yields in the present example a mean delay MD of 40 nanoseconds and a mean hop distance MH of 3 nodes. Hereafter, in 32, a second iteration counter value is initialized at zero and, in 33, a third cost value for a partial path corresponding to the latter value, i.e. the first partial path of the search set, is computed according to the following weighted combination:

$$th = j\ RD + (1-j)RH \quad (3)$$

Wherein th is the third cost value, j is the weight which is initialized at 0.5 and whose further change is clarified with reference to FIG. 4, RD is a first relative value computed by dividing the relevant entry in Table 1 by the mean delay MD and similarly RH is a second relative value computed by dividing the relevant entry in Table 2 by the mean hop distance MH. For next node 2 in this way in 33 the following third cost value is calculated:

$$th = 0.5 \frac{50}{40} + (1 - 0.5)\left(\frac{3}{3}\right) = 1.125$$

Note that it is supposed that j hasn't changed yet from its initial value.

After computing the above third cost value the routing logic means increments the second iteration counter. This is done in order to compute for each partial path in the search set a third cost value. Therefore, in 35, the routing logic means checks whether the latter counter value is smaller than the number of partial paths in the search set. As this is true the routing logic means loops back to 33 to compute another third cost value. Next node 4 corresponds to the iteration counter value and the following third cost value is computed:

$$th = 0.5\left(\frac{30}{40}\right) + (1 - 0.5)\left(\frac{3}{3}\right) = 0.875$$

Hereafter again the second counter is incremented in 34, but now the routing logic means finds that the latter value is no longer smaller than the aforementioned number so that it now jumps to 36.

The actual routing choice is now made and consists of searching over all partial paths in the search set which partial path has the smallest third cost value, i.e. routing is based on minimizing the third cost value. From the above it is clear that in the present example next node 4 is to be elected. Once this choice is made the routing logic means further proceeds to step 28 of the flow chart of FIG. 2.

As mentioned earlier the packet transmitted to node 4 is identical to the one received by node 3 and hence we can further describe the example with reference to the packet depicted in FIG. 1b. Note that the process of forwarding the packet from node 3 to node 4, as also the process of accepting and storing it in node 4, are not described in detail as many options to do so are well known to a person skilled in the art.

In node 4, assume that partial paths comprise X=2 nodes for a given reason, such as the instance where a majority of the neighboring nodes have signalled overload conditions. First portions of possible paths from node 4 to destination node 9 also comprise Y=2 nodes. Hereafter the strategy of the routing logic means will again, but now more briefly, be discussed in using the flow charts of FIGS. 2 and 3. The following parts of two tables i.e. Table 3 and Table 4 are used for the decisions of the routing logic means:

TABLE 3

| delays in ns | |
| --- | --- |
| 5-6 | 35 |
| 5-1 | 30 |
| 1-10 | 55 |
| 1-2 | 35 |
| 3-2 | 80 |

TABLE 4

| hop distance | |
| --- | --- |
| | 9 |
| 5-6 | 1 |
| 5-1 | 2 |
| 1-10 | 1 |
| 1-2 | 3 |
| 3-2 | 3 |

In Table 3 the estimated delays over the first portion of a possible path are listed per partial path characterized via its sequence of nodes. In the present case this first portion equals such a partial path therefore Table 3 also lists the estimated delay incurred over such a partial path.

It is to be noted that if the first portion for instance only comprises 1 node the listed delays would be the estimated delays to the first node of the corresponding partial path. It can be verified that except for this change in Table 3 no other change is required and the following description could equally well be used to describe the case where Y=1.

Table 4 is a larger table only specifying the hop distance from the end node of the corresponding possible path to destination node 9.

Again SRT(1) is found to be zero wherefore the total set of 5 partial paths is to be checked according to expression (1) in order to derive a suitable search set of possible partial paths. This is done in the loop of the flow chart on FIG. 2 as already described. In this case X equals 2, M equals 3 and N is to be found for the partial path on the corresponding row of Table 4. It can then be easily verified that only the partial paths over nodes 5-6, 5-1 and 1-10 respectively are to be considered as possible partial paths and will therefore belong to the search set searched in 27 or accordingly in the flow chart of FIG. 3.

When either the partial path over nodes 1 and 2 or the one over nodes 3 and 2 are checked in step 23, the routing logic means would find that these paths do not validate expression (1). With N=3 for both partial paths, as can be verified in Table 3, expression (1) gives 3+1>=2 ≠ which is not met and thus the routing logic means jumps from 23 to box 25 without adding either of the above partial paths to the search set.

Figure 3:
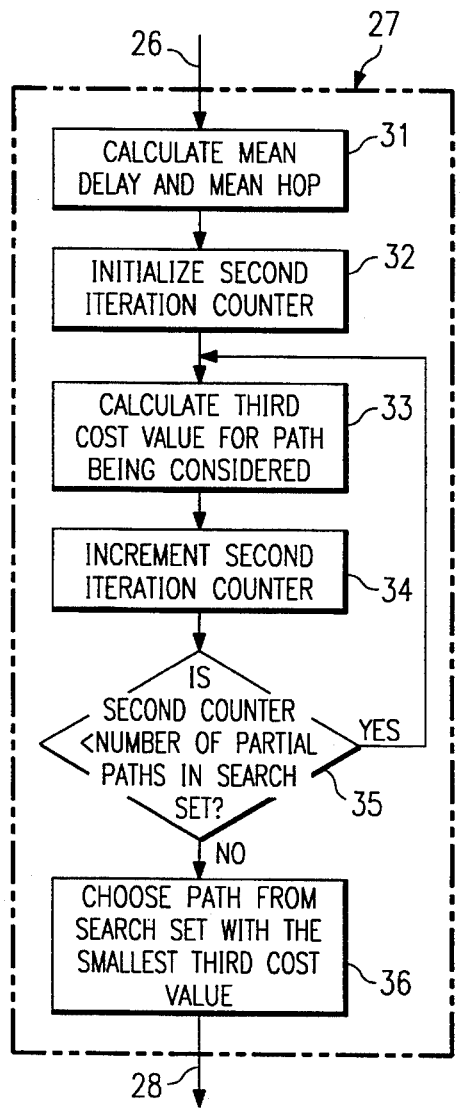
FIG. 3 shows a flow diagram of block 27 which is a portion of the flow diagram of FIG. 2.

Turning to FIG. 3 first, in 31, the mean delay MD and the mean hop distance MH will be computed as 40.0 nsec and 1.33 respectively. Hereafter in the previously described loop between 33 and 35 the three third cost values are computed again supposing that the weight j has retained its initial value 0.5. It can again be easily verified that the partial path via node 5 to node 6 yields the smallest third cost value, in 36, wherefore it will be chosen as the optimal partial path.

As the partial path now comprises 2 nodes, the self routing tag SRT will have to be changed in 28. Indeed, when arriving in node 5 no routing decision has to be made by the routing logic means so alleviating the load on this node and speeding up the routing process. Therefore the packet arriving in this node should designate its next node via the self routing tag SRT. In order to achieve the above the routing logic means of node 4 sets the leading bit of SRT indicating that the packet itself designates its next node, and it further designates node 6 in the set by setting the remaining bits equal to the binary number 00110 which is just decimal 6.

Finally in 29 the next hop which is node 5 is specified whereafter node 4 transmits the changed packet to node 5.

In node 5 again the flow chart of FIG. 2 will be executed by the routing logic means according to the present invention. But now, in checking the leading bit of the arriving packet, it finds that SRT(1)=1 and hence jumps from 21 to 210. In 210 the remaining bits of SRT are interpreted as the number of the node to which this packet is to be forwarded, this number being 6. Because no further nodes are specified in the SRT, the routing logic means further also clears the leading bit of SRT, in 210, before releasing the thus changed packet for transmission to node 6 in 211.

It is to be noted that partial paths comprising more than 2 nodes will require a somewhat more complex handling of the SRT which can however be achieved by one of many methods of handing self routing tags designating more than 2 nodes. The latter methods are certainly within the skills of a person skilled in the art.

In node 6 again only a next node is determined according to the following tables:

TABLE 5

| delays in nsec | |
|---|---|
| 7 | 15 |
| 9 | 20 |
| 5 | 25 |

TABLE 6

| hop distance | |
|---|---|
|  | 9 |
| 7 | 2 |
| 7 | 2 |
| 9 | 0 |
| 5 | 2 |

In checking the total set comprising next nodes 7, 9 and 5 against expression (1) only next node 9, which is also the destination node, forms part of the search set in 27. It will thus also be clear that the packet will be forwarded to the destination node 9.

It is to be noted that further refinements, such as bypassing the search algorithm of FIG. 3 when the search set contains only one possible partial path of the routing strategy, are obvious to realize wherefore they will not be further described. A more important aspect, but equally easy to implement, is that it must be avoided to have partial paths comprising more nodes than the hop distance to the destination node.

Finally it will be described with reference to FIG. 4 how the weight j is to be adapted in every node.

During a measurement interval the fluctuations in the estimated delays and hop distances will be measured and the value of the weight j adapted accordingly as explained hereafter. This measurement and adaptation is schematically shown in the flow chart of FIG. 4. Firstly, in 41, a time counter t is initialized at $t_0$, and a hop distance fluctuation parameter HF and a delay fluctuation parameter DF are reset. The time counter beginning at $t_0$ is used to determine the duration of the measurement interval which should preferably be orders of magnitude larger than the expected time between changes.

Then, in 42, the routing logic means checks whether a change in the hop distance table has occurred. If this is so the routing logic means proceeds to 43 and determines at what location a node or a link has failed or where a new node or link is activated, i.e. it determines the minimum hop distance HD to this node or link and increments HF with the inverse of HD. The latter is done because the importance of such a change in network topology is inversely proportional with its distance from the present node.

Note that for HD preferably the situation according to the new hop distance table is taken.

Hereafter, or directly after step 42 if no change occurred, the routing logic means proceeds to 44 wherein it is checked whether, since the previous check, a change occurred in the estimated delays. If so, the routing logic means proceeds to 45. In this step the percentage in change from an old estimate to a new estimate is calculated. In calling the new delay value ND, and the old delay value OD, we can express this percentage as:

$$\left( \frac{ND - OD}{OD} \right) \times 100 \qquad (4)$$

The delay fluctuation DF is then determined by calculating the expected percentage over the measurement interval, taking into account every single delay update received in the present node. From 45 an actual value of DF has to be available to go to 46. When no such change in the delay estimates has occurred the routing logic means directly proceeds from 44 to 46.

In 46 the time counter is decremented and then it is checked if the measurement interval has already ended, i.e. if $t_0$ equals zero. The latter is done in 47. If the time counter time, $t_r$, is still larger than zero the routing logic means loops back to step 42 for eventual further changes; this of course continues until $t_r$ becomes zero whereafter the routing logic means jumps from 47 to 48.

In step 48, relative fluctuations are calculated from the above-discussed actual fluctuations. Indeed, relative fluctuations are preferably considered since the two cost values are expressed in unrelated metrics (i.e. unrelated units). To this end an expected delay fluctuation EDF and an expected hop distance fluctuation EHF are used. These can be best computed by running the routine depicted in FIG. 4 once, skipping the next step 49 (wherein the weight j determining the relative importance of the cost values in the third cost value is adapted) and allocating the then found HF and DF to EHF and EDF. The relative fluctuations are obtained in step 48 by dividing HF and DF by respectively EHF and EDF.

Finally a routine for adapting the weight j according to these relative fluctuations is to be executed in step 49 whereafter the routing logic means will loop back to step 41.

Note that the above described routine is to be executed in parallel with the routines depicted in FIGS. 2 and 3.

The routine executed in 49 might for instance look like the one described hereafter and is essentially aimed at giving more weight to the most reliable of the two cost values, i.e. to the cost value whose relative fluctuation is the smallest of the two.

The routine could for instance look like: is $$\frac{DF}{EDF} < 1$$

then (relative delay fluctuation has decreased) if $$\frac{HF}{EHF} >= 1$$

then j:=j−k
else (both relative fluctuations have decreased so : skip)
else (relative delay fluctuation has increased) if $$\frac{HF}{EHF} >= 1$$

then (both relative fluctuations have increased so : skip)
else j:=j+K

The above routing can be refined in letting the value of the parameter K used therein be a function of the actual value of j and of the relative fluctuations DF/EDF and HF/EHF. Indeed, if the value of j is already larger than one half a less reliable delay estimate should force the value of j well down whereas the latter decrease in j should in a similar situation but with an actual value of j smaller than one half be much smaller. It should of course also be assured that the value of j stays comprised between 0 and 1.

Further refinements could make the parameter K dependent upon which relative fluctuation of the two has increased and also adapt j when both those values prove to be either more or less reliable. In the latter case the most reliable cost value is to be identified and given more weight. Such refinements are essentially an optimization process which can be carried out in full by a skilled person vis-a-vis the specific requirements in a specific application, wherefore they are not further described. While the principles of the invention have been described above in connection with specific apparatus, it is to be clearly understood that this description is made only by way of example and not as a limitation on the scope of the invention.

What is claimed is:

1. A method of routing a packet from a predetermined node to a destination node along a switching network comprising a plurality of packet switching nodes interconnected by respective links, comprising the steps of:

identifying a plurality of possible partial paths wherein each of said possible partial paths originates from said predetermined node and comprises X of said other packet switching nodes and their respective interconnecting links, where X is a positive integer; and choosing a selected partial path from said plurality of possible partial paths, wherein said choosing step further comprises at least the steps of:

for each of said plurality of possible partial paths, determining a first cost value equal to an estimated transmission delay over a first portion of a possible path, said possible path connecting said predetermined node with said destination node and including said possible partial path, said first portion comprising an arbitrarily selectable number of said packet switching nodes;

for each of said plurality of possible partial paths, determining a second cost value equal to an estimated transfer cost, different from said transmission delay, over a second portion of said possible path; and combining said first and second cost values to choose said selected partial path based on said combination, wherein said step of combining said first and second cost values comprises determining a third cost value by combining a weighed value of a first relative value and a second relative value, wherein said first relative value is determined by dividing said first cost value by the mean value of said first cost value taken over said first portion of all of said plurality of possible partial paths, and wherein said second relative value is determined by dividing said second cost value by the mean value of second cost value taken over said second portion for all of said plurality of possible partial paths, and wherein said choosing step comprises choosing said selected partial path having a minimal third cost value.

2. The method of claim 1 wherein said step of combining a weighed value comprises determining fluctuations of said first and second cost values relative to one another over a time interval so as to give less weight to those cost values having large fluctuations relative to one another.

3. The method of claim 1 wherein said step of, for each of said plurality of possible partial paths, determining a second cost value comprises determining a second cost value equal to a number of packet switching nodes over a second portion of said possible path.

4. A method of routing a packet from a predetermined node to a destination node along a switching network comprising a plurality of packet switching nodes interconnected by respective links, comprising the steps of:

identifying a plurality of possible partial paths wherein each of said possible partial paths originates from said predetermined node and comprises X of said other packet switching nodes and their respective interconnecting links, wherein X is a positive integer; and choosing a selected partial path from said plurality of possible partial paths, wherein said choosing step further comprises at least the steps of:

for each of said plurality of possible partial paths, determining a first cost value equal to an estimated transmission delay over a first portion of a possible path, said possible path connecting said predetermined node with said destination node and including said possible partial path;

for each of said plurality of possible partial paths, determining a second cost value, different from said estimated transmission delay, over a second portion of said possible path; and combining said first and second cost values to choose said selected partial path based on said combination, wherein said step of combining said first and second cost values comprises determining a third cost value by combining a weighed value of a first relative value and a second relative value, wherein said first relative value is determined by dividing said first cost value by the mean value of said first cost value taken over said first portion of all of said plurality of possible paths, and wherein said second relative value is determined by dividing said second cost value by the mean value of second cost value taken over said second portion of all of said plurality of possible partial paths, and wherein said choosing step comprises choosing said selected partial path having a minimal third cost value.

5. The method of claim 4 wherein said step of combining a weighed value comprises determining fluctuations of said first and second cost values relative to one another over a time interval so as to give less weight to those cost values having large fluctuations relative to one another.

6. The method of claim 4 wherein said step of determining a first cost value over a first portion of said possible path comprises determining said first cost value over Y nodes and their interconnecting links, wherein Y is a positive integer, and wherein said step of determining a second cost value equal to an estimated transfer cost over a second portion of said possible path comprises determining a second cost value over a second portion comprising all nodes and links of said possible path not comprised in said first portion.

7. The method of claim 6 wherein said step of combining said first and second cost values comprises determining a third cost value by combining a weighed value of a first relative value and a second relative value, wherein said first relative value is determined by dividing said first cost value by the mean value of said first cost value taken over said first portion all of said plurality of possible partial paths, and wherein said second relative value is determined by dividing said second cost value by the mean value of second cost value taken over said second portion all of said plurality of possible partial paths, and wherein said choosing step comprises choosing said selected partial path having a minimal third cost value.

8. The method of claim 7 wherein said step of combining a weighed value comprises determining fluctuations of said first and second cost values relative to one another over a time interval so as to give less weight to those cost values having large fluctuations relative to one another.

9. The method of claim 4:
wherein said step of determining a first cost value over a first portion of said possible path comprises determining said first cost value over Y nodes and their interconnecting links, wherein Y is a positive integer, and wherein said step of determining a second cost value equal to an estimated transfer cost over a second portion of said possible path comprises determining a second cost value over a second portion comprising all nodes and links of said possible path not comprised in said first portion; and
wherein identifying a plurality of possible partial paths comprising X of said other packet switching nodes and their respective interconnecting links comprises identifying a plurality of possible partial paths comprising one of said other packet switching nodes and their respective interconnecting links, and wherein said step of determining said cost value over Y nodes comprises determining said first cost value over one node.

10. The method of claim 9 wherein said step of choosing a selected partial path comprises, for each partial path, choosing only from the possible path corresponding to each said partial path having a minimal second cost value taken over the second cost values of all possible paths corresponding to each said partial path.

11. The method of claim 10 wherein said step of combining said first and second cost values comprises determining a third cost value by combining a weighed value of a first relative value and a second relative value, wherein said first relative value is determined by dividing said first cost value by the mean value of said first cost value taken over said first portion of all of said plurality of possible partial paths, and wherein said second relative value is determined by dividing said second cost value by the mean value of second cost value taken over said second portion for all of said plurality of possible partial paths, and wherein said choosing step comprises choosing said selected partial path having a minimal third cost value.

12. The method of claim 11 wherein said step of combining a weighed value comprises determining fluctuations of said first and second cost values relative to one another over a time interval so as to give less weight to those cost values having large fluctuations relative to one another.

13. The method of claim 4 wherein said step of identifying a plurality of possible partial paths comprising X of said other packet switching nodes comprises determining X on the basis of congestion information of neighboring nodes of said predetermined node so as to avoid any routing action to be taken by congested nodes.

14. The method of claim 4 wherein each of said partial paths has an end node, and wherein said packet includes a credit counter with a value, CC, which is initialized upon entering said network, wherein CC is a positive integer, and wherein said step of choosing a selected partial path from said plurality of possible partial paths comprises choosing only from partial paths for which the minimum number N of nodes from the end node of said partial path to said destination node and the minimum number M of nodes from said predetermined node to said destination node satisfies the expression: $M+CC \geq X+N$, wherein each of N and M is a positive integer.

15. The method of claim 14 and further comprising the step of increasing said credit counter value with a value $M-(N+X)$ after said choosing step.

16. The method of claim 4 and further comprising the steps of:
selectively filling in a self routing tag in said packet designating a chosen selected partial path if it comprises more than one node;
detecting the presence of said self routing tag in said packet; and
selectively transmitting said packet to a node designated by said self routing tag in response to the value of said self routing tag.

17. The method of claim 14 wherein said step of, for each of said plurality of possible partial paths, determining a second cost value comprises determining a second cost value equal to a number of packet switching nodes over a second portion of said possible path.

18. A method of routing a packet from a predetermined node to a destination node along a switching network comprising a plurality of packet switching nodes interconnected by respective links, comprising the steps of:
identifying a plurality of possible partial paths wherein each of said possible partial paths originates from said predetermined node and comprises X of said other packet switching nodes and their respective interconnecting links, wherein X is a positive integer; and choosing a selected partial path from said plurality of possible partial paths, wherein said choosing step further comprises at least the steps of:

for each of said plurality of possible partial paths, determining a first cost value equal to an estimated transmission delay over a first portion of a possible path, said possible path connecting said predetermined node with said destination node and including said possible partial path, wherein said step of determining a first cost value over a first portion of said possible path comprises determining said first cost value over Y nodes and their interconnecting links, wherein Y is a positive integer;

for each of said plurality of possible partial paths, determining a second cost value equal to an estimated transfer cost, different from said estimated transmission delay, over a second portion of said possible path, wherein said step of determining a second cost value equal to an estimated transfer cost over a second portion of said possible path comprises determining a second cost value over a second portion comprising all nodes and links of said possible path not comprised in said first portion; and combining said first and second cost values to choose said selected partial path based on said combination, wherein said step of combining said first and second cost values comprises determining a third cost value by combining a weighed value of a first relative value and a second relative value, wherein said first relative value is determined by dividing said first cost value by the mean value of said first cost value taken over said first portion of all of said plurality of possible partial paths, and wherein said second relative value is determined by dividing said second cost value by the mean value of second cost value taken over said second portion of all of said plurality of possible partial paths;

and wherein said choosing step comprises choosing said selected partial path having a minimal third cost value.

19. The method of claim 18 wherein said step of combining a weighed value comprises determining an importance of said first and second cost values relative to one another adapted according to fluctuations of said respective cost values relative to one another over a time interval so as to give less weight to those cost values having large fluctuations relative to one another.

20. The method of claim 18 wherein said step of combining a weighed value comprises determining fluctuations of said first and second cost values relative to one another over a time interval so as to give less weight to those cost values having large fluctuations relative to one another.

21. The method of claim 18 wherein identifying a plurality of possible partial paths comprising X of said other packet switching nodes and their respective interconnecting links comprises identifying a plurality of possible partial paths comprising one of said other packet switching nodes and their respective interconnecting links, and wherein said step of determining said cost value over Y nodes comprises determining said first cost value over one node.

22. The method of claim 21 wherein said step of choosing a selected partial path comprises, for each partial path, choosing only from the possible path corresponding to each said partial path having a minimal second cost value taken over the second cost values of all possible paths corresponding to each said partial path.

23. The method of claim 18 wherein said step of identifying a plurality of possible partial paths comprising X of said other packet switching nodes comprises determining X on the basis of congestion information of neighboring nodes of said predetermined node so as to avoid any routing action to be taken by congested nodes.

24. The method of claim 18 wherein each of said partial paths has an end node, and wherein said packet includes a credit counter with a value, CC, which is initialized upon entering said network, wherein CC is a positive integer, and wherein said step of choosing a selected partial path from said plurality of possible partial paths comprises choosing only from partial paths for which the minimum number N of nodes from the end node of said partial path to said destination node and the minimum number M of nodes from said predetermined node to said destination node satisfies the expression: $M+CC \geq X+N$, wherein each of N and M is a positive integer.

25. The method of claim 24 and further comprising the step of increasing said credit counter value with a value $M-(N+X)$ after said choosing step.

26. The method of claim 18 and further comprising the steps of:

selectively filling in a self routing tag in said packet designating a chosen selected partial path if it comprises more than one node;

detecting the presence of said self routing tag in said packet; and selectively transmitting said packet to a node designated by said self routing tag in response to the value of said self routing tag.

27. The method of claim 18 wherein said step of, for each of said plurality of possible partial paths, determining a second cost value comprises determining a second cost value equal to a number of packet switching nodes over a second portion of said possible path.

28. A method of routing a packet from a predetermined node to a destination node along a switching network comprising a plurality of packet switching nodes interconnected by respective links, comprising the steps of:

identifying a plurality of possible partial paths wherein each of said possible partial paths originates from said predetermined node and comprises X of said other packet switching nodes and their respective interconnecting links, wherein X is a positive integer, wherein identifying a plurality of possible partial paths comprising X of said other packet switching nodes and their respective interconnecting links comprises identifying a plurality of possible partial paths comprising one of said other packet switching nodes and their respective interconnecting links; and choosing a selected partial path from said plurality of possible partial paths, wherein said choosing step further comprises at least the steps of:

for each of said plurality of possible partial paths, determining a first cost value equal to an estimated transmission delay over a first portion of a possible path, said possible path connecting said predetermined node with said destination node and including said possible partial path, wherein said step of determining a first cost value over a first portion of said possible path comprises determining said first cost value over Y nodes and their interconnecting links, wherein said step of determining said cost value over Y nodes comprises determining said first cost value over one node, wherein Y is a positive integer;

for each of said plurality of possible partial paths, determining a second cost value, different from said estimated transmission delay, over a second portion of said possible path, wherein said step of determining a second cost value over a second portion of said possible path comprises determining a second cost value over a second portion comprising all nodes and links of said possible path not comprised in said first portion; and combining said first and second cost values to choose said selected partial path based on said combination, wherein said step of combining said first and second cost values comprises determining a third cost value by combining a weighed value of a first relative value and a second relative value, wherein said first relative value is determined by dividing said first cost value by the mean value of said first cost value taken over said first portion of all of said plurality of possible partial paths, and wherein said second relative value is determined by dividing said second cost value by the mean value of second cost value taken over said second portion of all of said plurality of possible partial paths;

and wherein said choosing step comprises choosing said selected partial path having a minimal third cost value.

29. The method of claim 28 wherein said step of combining a weighed value comprises determining fluctuations of said first and second cost values relative to one another over a time interval so as to give less weight to those cost values having large fluctuations relative to one another.

30. The method of claim 28 wherein said step of identifying a plurality of possible partial paths comprising X of said other packet-switching nodes comprises determining X on the basis of congestion information of neighboring nodes of said predetermined node so as to avoid any routing action to be taken by congested nodes.

31. The method of claim 28 wherein each of said partial paths has an end node, and wherein said packet includes a credit counter with a value, CC, which is initialized upon entering said network, wherein CC is a positive integer, and wherein said step of choosing a selected partial path from said plurality of possible partial paths comprises choosing only from partial paths for which the minimum number N of nodes from the end node of said partial path to said destination node and the minimum number M of nodes from said predetermined node to said destination node satisfies the expression: M+CC>=X+N, wherein each of N and M is a positive integer.

32. The method of claim 31 and further comprising the step of increasing said credit counter value with a value M−(N+X) after said choosing step.

33. The method of claim 28 and further comprising the steps of:

selectively filling in a self routing tag in said packet designating a chosen selected partial path if it comprises more than one node;

detecting the presence of said self routing tag in said packet; and selectively transmitting said packet to a node designated by said self routing tag in response to the value of said self routing tag.

34. The method of claim 28 wherein said step of, for each of said plurality of possible partial paths, determining a second cost value comprises determining a second cost value equal to a number of packet switching nodes over a second portion of said possible path.

35. A method of routing a packet from a predetermined node to a destination node along a switching network comprising a plurality of packet switching nodes interconnected by respective links, comprising the steps of:

identifying a plurality of possible partial paths wherein each of said possible partial paths originates from said predetermined node and comprises X of said other packet switching nodes and their respective interconnecting links, wherein X is a positive integer; and choosing a selected partial path from said plurality of possible partial paths, wherein said choosing step further comprises at least the steps of:

for each of said plurality of possible partial paths, determining a first cost value equal to an estimated transmission delay over a first portion of a possible path, said possible path connecting said predetermined node with said destination node and including said possible partial path;

for each of said plurality of possible partial paths, determining a second cost value equal, different from said estimated transmission delay, over a second portion of said possible path; and· combining said first and second cost values to choose said selected partial path based on said combination;

wherein each of said partial paths has an end node, and wherein said packet includes a credit counter with a value CC which is initialized upon entering said network wherein CC is a positive integer, and wherein said step of choosing a selected partial path from said plurality of possible partial paths comprises choosing only from partial paths for which the minimum number N of nodes from the end node of said partial path to said destination node and the minimum number M of nodes from said predetermined node to said destination node satisfies the expression: M+CC>=X+N, wherein each of N and M is a positive integer;

and further comprising the step of increasing said credit counter value with a value M−(N+X) at the end node of said chosen partial path.

36. The method of claim 35 wherein said step of determining a first cost value over a first portion of said possible path comprises determining said first cost value over Y nodes and their interconnecting links, wherein Y is a positive integer, and wherein said step of determining a second cost value equal to an estimated transfer cost over a second portion of said possible path comprises determining a second cost value over a second portion comprising all nodes and links of said possible path not comprised in said first portion.

37. The method of claim 35 wherein said step of combining said first and second cost values comprises determining a third cost value by combining a weighed value of a first relative value and a second relative value, wherein said first relative value is determined by dividing said first cost value by the mean value of said first cost value taken over said first portion all of said plurality of possible partial paths, and wherein said second relative value is determined by dividing said second cost value by the mean value of second cost value taken over said second portion for all of said plurality of possible partial paths, and wherein said choosing step comprises choosing said selected partial path having a minimal third cost value.

38. The method of claim 37 wherein said step of combining a weighed value comprises determining fluctuations of said first and second cost values relative to one another over a time interval so as to give less weight to those cost values having large fluctuations relative to one another.

39. The method of claim 35:

wherein said step of determining a first cost value over a first portion of said possible path comprises determining said first cost value over Y nodes and their interconnecting links, wherein Y is a positive integer, and wherein said step of determining a second cost value equal to an estimated transfer cost over a second portion of said possible path comprises determining a second cost value over a second portion comprising all nodes and links of said possible path not comprised in said first portion; and wherein identifying a plurality of possible partial paths comprising X of said other packet switching nodes and their respective interconnecting links comprises identifying a plurality of possible partial paths comprising one of said other packet switching nodes and their respective interconnecting links, and wherein said step of determining said cost value over Y nodes comprises determining said first cost value over one node.

40. The method of claim 39 wherein said step of choosing a selected partial path comprises, for each partial path, choosing only from the possible path corresponding to each said partial path having a minimal second cost value taken over the second cost values of all possible paths corresponding to each said partial path.

41. The method of claim 39 wherein said step of combining said first and second cost values comprises determining a third cost value by combining a weighed value of a first relative value and a second relative value, wherein said first relative value is determined by dividing said first cost value by the mean value of said first cost value taken over said first portion of all of said plurality of possible partial paths, and wherein said second relative value is determined by dividing said second cost value by the mean value of second cost value taken over said second portion for all of said plurality of possible partial paths, and wherein said choosing step comprises choosing said selected partial path having a minimal third cost value.

42. The method of claim 41 wherein said step of combining a weighed value comprises determining fluctuations of said first and second cost values relative to one another over a time interval so as to give less weight to those cost values having large fluctuations relative to one another.

43. The method of claim 35 wherein said step of identifying a plurality of possible partial paths comprising X of said other packet switching nodes comprises determining X on the basis of congestion information of neighboring nodes of said predetermined node so as to avoid any routing action to be taken by congested nodes.

44. The method of claim 35 and further comprising the steps of:

selectively filling in a self routing tag in said packet designating a chosen selected partial path if it comprises more than one node;

detecting the presence of said self routing tag in said packet; and selectively transmitting said packet to a node designated by said self routing tag in response to the value of said self routing tag.

45. The method of claim 35 wherein said step of, for each of said plurality of possible partial paths, determining a second cost value comprises determining a second cost value equal to a number of packet switching nodes over a second portion of said possible path.

46. A method of routing a packet from a predetermined node to a destination node along a switching network comprising a plurality of packet switching nodes interconnected by respective links, comprising the steps of:

identifying a plurality of possible partial paths wherein each of said possible partial paths originates from said predetermined node and comprises X of said other packet switching nodes and their respective interconnecting links, where X is a positive integer; and choosing a selected partial path from said plurality of possible partial paths, wherein said choosing step further comprises at least the steps of:

for each of said plurality of possible partial paths, determining a first cost value equal to an estimated transmission delay over a first portion of a possible path, said possible path connecting said predetermined node with said destination node and including said possible partial path, said first portion comprising an arbitrarily selectable number of said packet switching nodes;

for each of said plurality of possible partial paths, determining a second cost value equal to an estimated transfer cost, different from said transmission delay, over a second portion of said possible path; and combining said first and second cost values to choose said selected partial path based on said combination, wherein said step of determining a first cost value over a first portion of said possible path comprises determining said first cost value over Y nodes and their interconnecting links, wherein Y is a positive integer, and wherein said step of determining a second cost value equal to an estimated transfer cost over a second portion of said possible path comprises determining a second cost value over a second portion comprising all nodes and links of said possible path not comprised in said first portion;

wherein said step of combining said first and second cost values comprises determining a third cost value by combining a weighed value of a first relative value and a second relative value, wherein said first relative value is determined by dividing said first cost value by the mean value of said first cost value taken over said first portion all of said plurality of possible partial paths, and wherein said second relative value is determined by dividing said second cost value by the mean value of second cost value taken over said second portion for all of said plurality of possible partial path, and wherein said choosing step comprises choosing said selected partial path having a minimal third cost value.

47. The method of claim 46 wherein said step of combining a weighed value comprises determining fluctuations of said first and second cost values relative to one another over a time interval so as to give less weight to those cost values having large fluctuations relative to one another.

48. A method of routing a packet from a predetermined node to a destination node along a switching network comprising a plurality of packet switching nodes interconnected by respective links, comprising the steps of:

identifying a plurality of possible partial paths wherein each of said possible partial paths originates from said predetermined node and comprises X of said other packet switching nodes and their respective interconnecting links, where X is a positive integer; and choosing a selected partial path from said plurality of possible partial paths, wherein said choosing step further comprises at least the steps of:

for each of said plurality of possible partial paths, determining a first cost value equal to an estimated transmission delay over a first portion of a possible path, said possible path connecting said predetermined node with said destination node and including said possible partial path, said first portion comprising an arbitrarily selectable number of said packet switching nodes;

for each of said plurality of possible partial paths, determining a second cost value equal to an estimated transfer cost, different from said transmission delay, over a second portion of said possible path; and combining said first and second cost values to choose said selected partial path based on said combination, wherein said step of determining a first cost value over a first portion of said possible path comprises determining said first cost value over Y nodes and their interconnecting links, wherein Y is a positive integer, and wherein said step of determining a second cost value equal to an estimated transfer cost over a second portion of said possible path comprises determining a second cost value over a second portion comprising all nodes and links of said possible path not comprised in said first portion; and wherein identifying a plurality of possible partial paths comprising X of said other packet switching nodes and their respective interconnecting links comprises identifying a plurality of possible partial paths comprising one of said other packet switching nodes and their respective interconnecting links, and wherein said step of determining said cost value over Y nodes comprises determining said first cost value over one node;

wherein said step of choosing a selected partial path comprises, for each partial path, choosing only from the possible path corresponding to each said partial path having a minimal second cost value taken over the second cost values of all possible paths corresponding to each said partial path;

wherein said step of combining said first and second cost values comprises determining a third cost value by combining a weighed value of a first relative value and a second relative value, wherein said first relative value is determined by dividing said first cost value by the mean value of said first cost value taken over said first portion of all of said plurality of possible partial paths, and wherein said second relative value is determined by dividing said second cost value by the mean value of second cost value taken over said second portion for all of said plurality of possible partial paths, and wherein said choosing step comprises choosing said selected partial path having a minimal third cost value.

49. The method of claim 48 wherein said step of combining a weighed value comprises determining fluctuations of said first and second cost values relative to one another over a time interval so as to give less weight to those cost values having large fluctuations relative to one another.

50. A method of routing a packet from a predetermined node to a destination node along a switching network comprising a plurality of packet switching nodes interconnected by respective links, comprising the steps of:

identifying a plurality of possible partial paths wherein each of said possible partial paths originates from said predetermined node and comprises X of said other packet switching nodes and their respective interconnecting links, where X is a positive integer; and choosing a selected partial path from said plurality of possible partial paths, wherein said choosing step further comprises at least the steps of:

for each of said plurality of possible partial paths, determining a first cost value equal to an estimated transmission delay over a first portion of a possible path, said possible path connecting said predetermined node with said destination node and including said possible partial path, said first portion comprising an arbitrarily selectable number of said packet switching nodes;

for each of said plurality of possible partial paths, determining a second cost value equal to an estimated transfer cost, different from said transmission delay, over a second portion of said possible path;

combining said first and second cost values to choose said selected partial path based on said combination; and wherein each of said partial paths has an end node, and wherein said packet includes a credit counter with a value, CC, which is initialized upon entering said network, wherein CC is a positive integer, and wherein said step of choosing a selected partial path from said plurality of possible partial paths comprises choosing only from partial paths for which the minimum number N of nodes from the end node of said partial path to said destination node and the minimum number M of nodes from said predetermined node to said destination node satisfies the expression: M+CC>=X+N, wherein each of N and M is a positive integer.

51. The method of claim 50 and further comprising the step of increasing said credit counter value with a value M−(N+X) after said choosing step.

* * * * *

UNITED STATES PATENT AND TRADEMARK OFFICE
CERTIFICATE OF CORRECTION

PATENT NO.   : 5,471,467
DATED        : November 28, 1995
INVENTOR(S)  : Charles F.M. Johann It is certified that error appears in the above-indentified patent and that said Letters Patent is hereby corrected as shown below:

Col. 6, line 62, delete "35".

Col. 9, line 5, delete "3+1>=2≠", insert --3+1>=2+3--.

Col. 9, TABLE 6, delete first row of "7   2".

Col. 11, line 17, delete "like: is", insert --like: if--

Col. 13, line 13, delete first "of", insert --for--.

Signed and Sealed this

Seventh Day of May, 1996

Attest:

BRUCE LEHMAN

Attesting Officer

Commissioner of Patents and Trademarks